United States Patent [19]
Coggins et al.

[11] Patent Number: 5,494,432
[45] Date of Patent: Feb. 27, 1996

[54] INJECTION MOLD INCLUDING POROUS MOLD INSERTS FOR FORMING A FISHING LURE

[76] Inventors: Fred H. Coggins, Rte. 1, Box 14, Brookland, Ark. 72417; Larry Watson, 1825 Air Industrial Rd., Grenada, Miss. 38901

[21] Appl. No.: 235,903

[22] Filed: May 4, 1994

[51] Int. Cl.⁶ .......................... B29C 45/34; B29C 39/28
[52] U.S. Cl. .......................... 425/546; 43/42.24; 249/113; 249/141; 249/160; 425/572; 425/573; 425/588; 425/805; 425/812; 425/DIG. 119
[58] Field of Search .......................... 425/805, 812, 425/190, 546, 572, 573, 588; 249/113, 141, 160; 425/DIG. 119; 43/42.24, 42.26; 264/243

[56] References Cited

U.S. PATENT DOCUMENTS

| | | | |
|---|---|---|---|
| 3,013,308 | 12/1961 | Armour | 425/573 |
| 3,474,498 | 10/1969 | Hoppes | 425/812 |
| 3,810,599 | 5/1974 | Fornari | 425/805 |
| 4,069,610 | 1/1978 | Firmin | 43/42.24 |
| 4,872,827 | 10/1989 | Noda | 249/141 |
| 5,059,380 | 10/1991 | Wise et al. | 425/812 |
| 5,271,888 | 12/1993 | Sinsley | 249/113 |

FOREIGN PATENT DOCUMENTS 49-20618  5/1974  Japan .......................... 264/243

Primary Examiner—Robert B. Davis
Attorney, Agent, or Firm—Stephen D. Carver; Trent C. Keisling

[57] ABSTRACT

A mold and injection molding process for the production of a fishing lure having multiple, integral bristles extending vertically from the lure. The mold defines an internal cavity in communication with an injection port and a ventilation port. The internal cavity defines a fishing lure having a desired shape. The cavity contains a pair of porous halves that facilitate the formation of integral bristles. Molten material is injected into the cavity through the injection port while air escapes through the ventilation port. The molten material penetrates the porous insert to form the bristles. The bristles are concurrently and integrally molded with the rest of the lure. After curing, the fishing lure is removed from the mold.

10 Claims, 3 Drawing Sheets

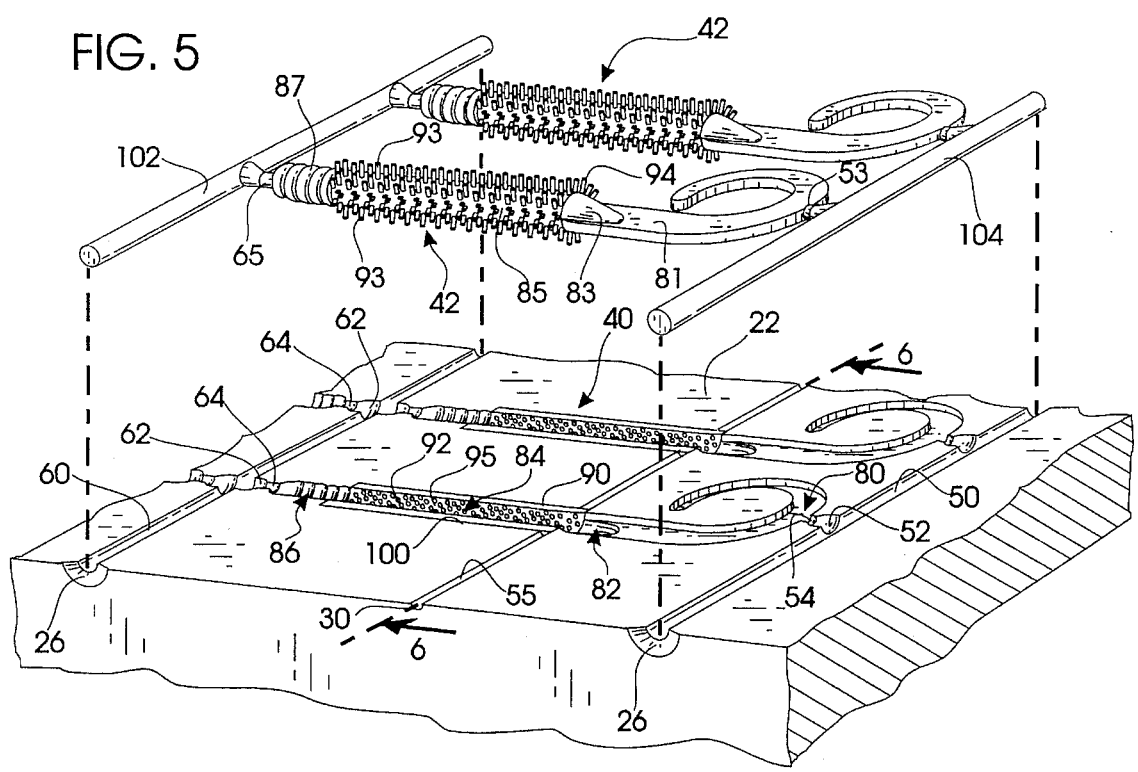
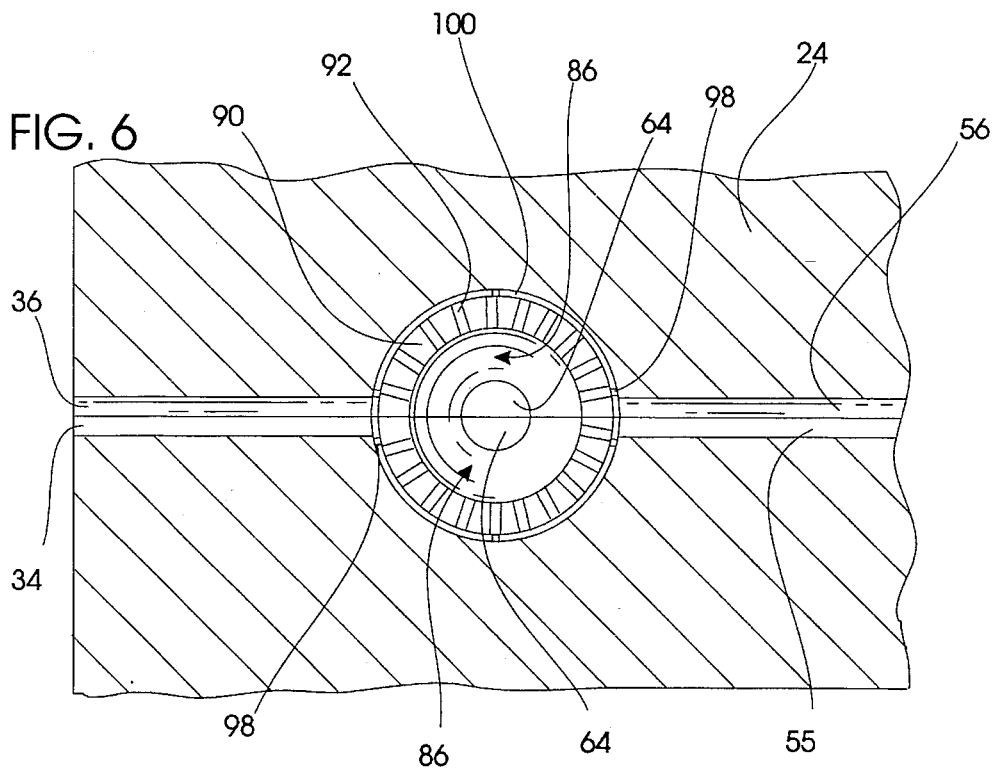

INJECTION MOLD INCLUDING POROUS MOLD INSERTS FOR FORMING A FISHING LURE

BACKGROUND OF THE INVENTION

1. Field of the Invention

The present invention relates to a molding process and mold or die for producing a fishing lure. The production of fishing lures has evolved over the years from hand carved individual lure production to modern methods of mass production. Previously, fishing lures were individually hand carved from wood or a similar material. Today, most fishing lures are produced from thermoplastic materials utilizing injection molding techniques.

2. Description of the Prior Art

One type of popular lure currently produced using injection molding is the plastic worm. This type of fishing lure is produced by injecting thermoplastic material into a worm-shaped mold or die and then allowing it to cure.

Most injection molds comprise halves that mate to define an internal cavity that conforms to the shape of the desired product. The cavity communicates with an injection port and a ventilation port to facilitate the injection process. The thermoplastic material is injected into the injection port and the ventilation port allows the air inside the mold to escape.

Several different designs and shapes of plastic worms may be produced using a similar injection process by simply changing the mold. However, the prior art plastic worms produced using typical injection molding have been simple in their design and construction.

Prior art of some relevance may be found in U.S. classes 264 and 249 and the various subclasses listed thereunder. U.S. Pat. No. 4,278,231, issued Jul. 14, 1981, to McGahee teaches the injection molding of fishing lures incorporating hook hangers.

U.S. Pat. No. 4,422,986, issued Dec. 27, 1983, to Cole, describes a process of injection molding bristles that are integrally formed upon a stem. This patent is directed to brush products and the mold comprises separable pieces that are combined to form the individual bristles.

U.S. Pat. No. 4,149,334, issued Apr. 17, 1979, to Rogers, teaches a method of molding a plastic lure around a hook that has barbules previously positioned on it. The barbules extend from the interior of the lure to the exterior of the lure.

U.S. Pat. No. 3,959,060, issued May 25, 1976, to Jones discloses a method of making a fishing lure that has decorative weights dispersed within the molded lure.

Although the method of production is not described, U.S. Pat. No. Des. 302,290, issued Jul. 18, 1989, to Polston and U.S. Pat. No. Des. 230,731, issued Mar. 12, 1974, to Owen and U.S. Pat. No. Des. 321,739, issued Nov. 19, 1991, to Thompson all describe fishing lures that are somewhat similar in appearance to the product of the present invention.

However, the prior art fails to teach a fishing lure mold and molding process that produces fishing lures that have multiple, encircling projections extending vertically from the lure surface. The prior art also fails to teach a method of producing a lure having these projections or bristles integrally molded from the same material and at the same time that the rest of the lure is molded.

SUMMARY OF THE INVENTION

This invention presents an injection molding process and mold or die for simultaneously fabricating fishing lures. The resulting fishing lures each have multiple, integral bristles extending outwardly from their bodies to give them a unique appearance.

The fishing lure mold comprises two plates. Each of the plates defines an internal cavity communicating with injection and ventilation ports. Of course, the mold may define as many cavities as desired together with the necessary injection and ventilation ports to produce the desired quantity of fishing lures.

The injection and ventilation ports interconnect in fluid flow communication with each cavity. The injection port allows the injection of thermoplastic material into each internal cavity. The ventilation port allows air to escape from the interior of the mold. The number and internal arrangement of the ports can be varied as discussed hereinafter.

Preferably, each half of the mold cavities contains a porous insert. The pores extend through each insert and allow the fluid thermoplastic material to penetrate the insert. This penetration of the insert by the fluid material results in the concurrent formation of integral bristles. In other words, the bristles are molded at the same time and from the same material as the rest of the lure.

Therefore, it is a primary object of the present invention to provide an injection molding process and mold for producing a fishing lure having integral bristles.

A further object of the present invention is to provide a mold for fabricating a lure that may be completely automated.

A related object of the present invention is to provide a single step injection molding process and mold that is simple to operate manually.

A still further object of the present invention is to provide a mold for injection molding that is adapted to produce a fishing lure having bristles molded from the same material and having the same coloration as the lure.

A further object of the present invention is to provide a mold that is relatively simple to clean.

A related object of the present invention is to provide a mold of the type described that requires a minimum amount of maintenance. A further object of the present invention is to provide an apparatus for manufacturing fishing lures that will reduce labor requirements and result in an inexpensive end product.

A related object of the present invention is to provide an injection molding process that will provide increased production and reduce cost.

A basic object of the present invention is to provide a lure having concurrently molded integral bristles extending vertically from the lure body.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 5 is an enlarged, fragmentary, partially exploded perspective view of the mold and the product, with portions thereof broken away for clarity or omitted for brevity; and, FIG. 6 is an enlarged, fragmentary, sectional view taken generally along line 6—6 of FIG. 5.

DETAILED DESCRIPTION

Figure 1:
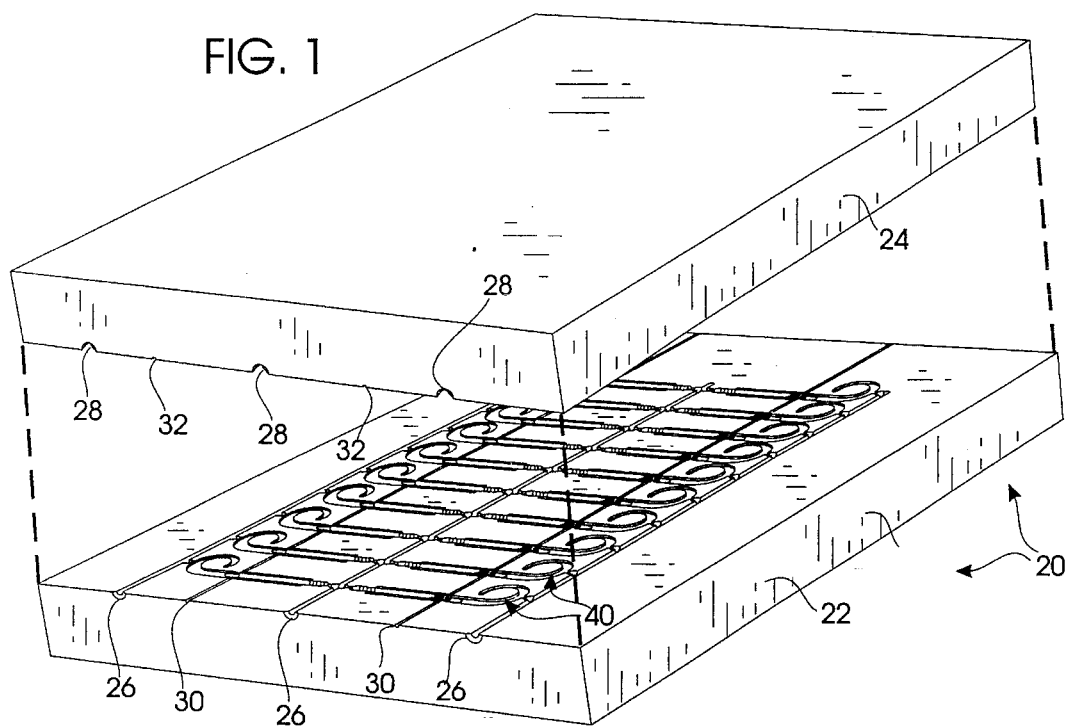
FIG. 1 is a fragmentary, perspective view of my mold with portions omitted for brevity.
Figure 2:
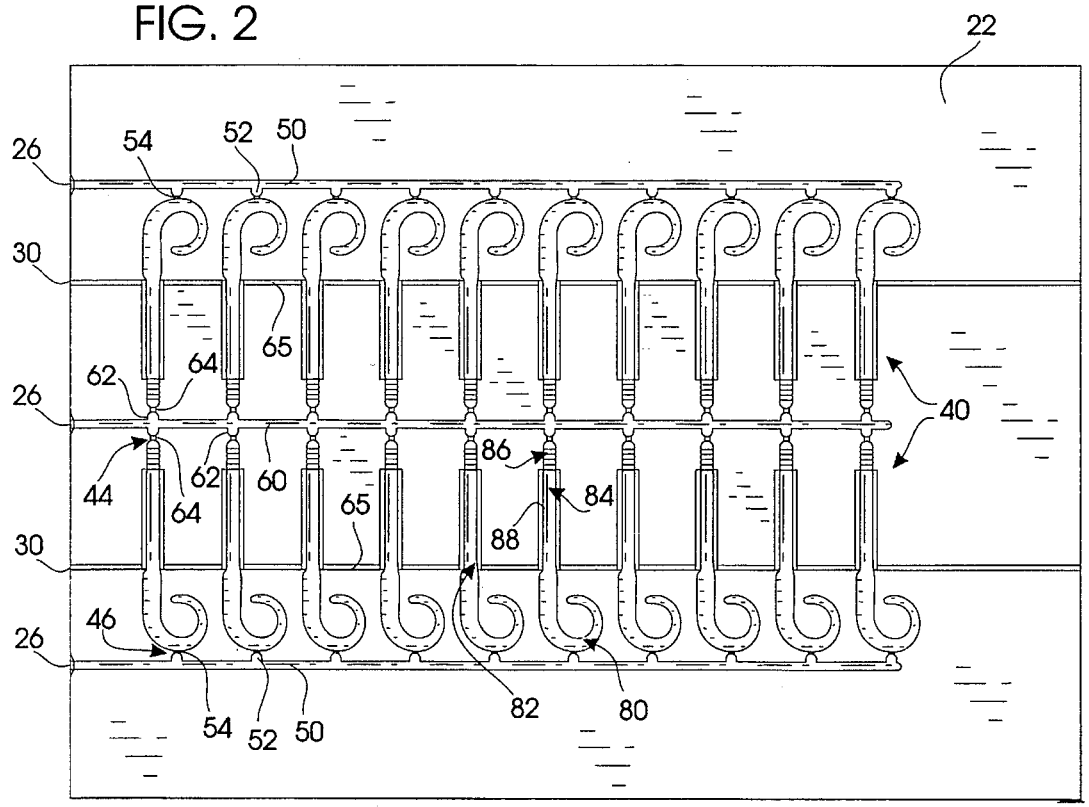
FIG. 2 is a fragmentary, top plan view of the bottom half of the mold, the top half being a mirror image thereof, with sections omitted for brevity.

With reference to the accompanying drawings, the fishing lure mold is designated by the reference numeral 20. The mold 20 comprises two halves. The halves comprise a bottom plate 22 and a top plate 24. The top plate 24 mates with the bottom plate 22 to form the mold.

The bottom plate 22 and the top plate 24 interiorly define multiple injection ports 26, 28, ventilation ports 30, 32 and mold cavities 40. When the plates 22, 24 mate and align properly, the injection ports 26 and 28 combine to provide an entrance for the conduction of the thermoplastic material into the mold cavities 40. The ventilation ports 30 and 32 also combine to provide an exit to allow entrapped air to escape from the mold. The injection of the thermoplastic material into the mold cavities 40 and the subsequent shaping and curing therein results in the production of a fishing lure 42.

The injection molding process is similar to other injection molding processes. The top plate 24 aligns and mates with the bottom plate 22. The thermoplastic material is heated and conducted under pressure to the injection ports 26 and 28 where it is injected into the mold. The molten material flows through the injection ports 26 and 28 down the channels 50 and 60. It encounters the flow chambers 52 and 62 where it enters the mold cavities 40.

The flow nozzles 54 and 64 promote the unidirectional flow of the molten material into the cavities 40 and the escape of entrapped air to the exterior of the mold 20. The molten material enters at the head end 44 and the tail end 46 of each cavity 40 simultaneously.

The injection ports 26 and 28 and channels 50 and 60 may be arranged in almost any desired configuration. However, it is preferable that the injection of fluent material into the cavity proceed from the exterior of the cavity 40 toward the porous insert 90.

It is also desirable that the flow from the head end 44 fill the cavity 40 faster than the flow from the tail end 46 because of the positioning of the ventilation channels 65. For this reason, flow nozzle 64 has a slightly larger diameter than flow nozzle 54. Preferabley, the ventilation channels 65 intersect the body cavity 84 adjacent the tail support cavity 82 and extend through the entire mold 20. However, the ventilation channels 65 may be relocated to another position as long as the channels 65 intersect the insert 90 at some point.

Figure 3:
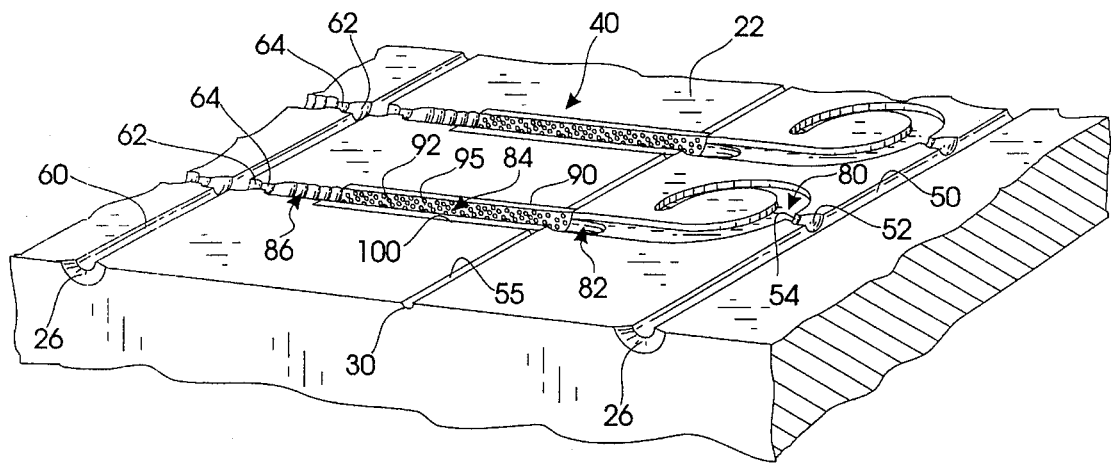
FIG. 3 is an enlarged, fragmentary, perspective view of the mold, with portions thereof broken away for clarity or omitted for brevity.
Figure 4:
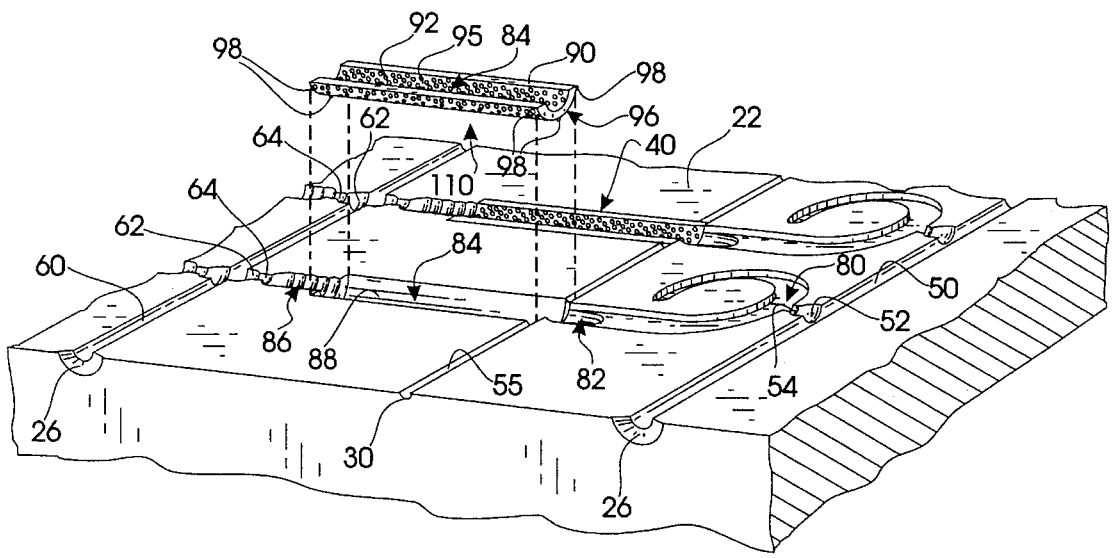
FIG. 4 is an enlarged, fragmentary, partially exploded perspective view similar to FIG. 3, but illustrating displacement of an insert half, with portions thereof broken away for clarity or omitted for brevity.

Turning to FIGS. 3–5, it can be seen that the mold cavity 40 comprises four primary sections. The tail cavity 80, tail support cavity 82, body cavity 84 and head cavity 86 of each internal cavity 40 are shaped to form the corresponding tail 81, tail support 83, body 85 and head 87 of each worm 42.

As the molten material enters the cavities 40, entrapped air escapes through ventilation channels 65 that interconnect with the porous insert 90. The air proceeds to ventilation ports 30 and 32 where it is exteriorly vented.

A semicylindrical, metallic porous insert 90 is adapted to be secured to the semicylindrical interior of the body cavity 84. The insert 90 comprises a semicylindrical shell that is penetrated by multiple small pores 92. Preferably, the pores 92 are perpendicular to the tangent of the curve 96 of the interior surface 95 of the insert 90. These pores 92 facilitate the concurrent formation of the integral bristles 93 of the worm 42.

The insert 90 further comprises support tabs 98 that project perpendicularly from the exterior surface 110 of the insert of position the insert A narrow gap or ventilation annulus 100 exists between the insert 90 and the body cavity wall 88. The ventilation annulus 100 between the insert 90 and the wall 88 must extend substantially along the entire outer surface 110 of the insert 90 and the body cavity 84. The ventilation annulus 100 permits the molten material to penetrate the pores 92 of the insert 90 because it allows entrapped air to move from the pores 92 of the insert 90 into the ventilation channels 65. However, the ventilation annulus 100 does not allow the molten material to flow to the ventilation channels 65.

The insert 90 may be permanently attached to the body cavity 84 by spot welding or in any other suitable manner. However, it is desirable to affix the insert 90 to the body cavity 84 in a manner that will simplify future removal of the insert 90 for replacement or cleaning.

The penetration of the insert 90 by the molten material concurrently forms the integral bristles 93. In other words, the bristles are simultaneously molded from the same material and at the same time that the rest of the worm 42 is molded. Preferably, each bristle 93 is cylindrically shaped with a flat end 94. Also, each bristle 93 extends vertically outward from the body 85.

Webbings 102 and 104 interconnect the worms 42 to provide for the convenient removal of the finished worms 42 from the mold 20. Breakaway tabs 65 and 53 are formed by the nozzles 64 and 54 and connect the webbings 102 and 104 to the worms 42.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A compound injection mold for making bristled fishing lures, said mold comprising:

a rigid bottom plate;

a rigid top plate adapted to be coupled to said bottom plate;

at least one cavity formed between said top and bottom plates, said cavity forming a fishing lure, said lure having a head, a body and a tail;

at least one injection port for injecting fluent, elastomeric material into said cavity;

at least one ventilation port for venting air from said cavity;

insert means adapted to be deployed within said cavity for forming a plurality of bristles upon said fishing lure concurrently with the molding of the lure, said insert means comprising a pair of elongated, semi-cylindrical, metallic halves adapted to be disposed within said cavity to surround said body and form bristles that integrally project outwardly therefrom, each of said halves comprising a plurality of spaced apart pores in which said bristles are formed.

2. The fishing lure mold as defined in claim 1 wherein a ventilation annulus is formed between said insert means and said cavity in fluid flow communication with said pores to vent said mold.

3. The fishing lure mold as defined in claim 2 wherein said mold comprises at least two injection ports, said ports intersecting said cavity adjacent said insert.

4. The fishing lure mold as defined in claim 3 wherein said insert is adapted to be removed from said cavity.

5. A fishing lure mold, comprising:

a stationary bottom plate and a mobile top plate adapted to mate with said bottom plate to define an internal cavity therebetween;

at least one injection port for injecting fluent material into said cavity and at least one ventilation port for the escape of entrapped air from said cavity;

said cavity defining a fishing lure, said lure having a head, a body and a tail;

at least two porous inserts adapted to be disposed within said cavity circumscribing said body; and, whereby said fluent material penetrates said insert to integrally form multiple bristles upon said body.

6. The fishing lure mold as defined in claim 5 wherein said at least two inserts comprise a pair of elongated, semi-cylindrical, metallic halves adapted to be disposed within said cavity to surround said body and integrally form said bristles, each of said halves comprising a plurality of spaced apart pores in which said bristles are formed.

7. The fishing lure mold as defined in claim 6 wherein a ventilation annulus is formed between said insert and said cavity in fluid flow communication with said pores to vent said mold.

8. The fishing lure mold as defined in claim 7 wherein said mold comprises at least two injection ports, said ports intersecting said cavity adjacent said head and said tail.

9. The fishing lure mold as defined in claim 8 wherein said ventilation port intersects said cavity adjacent said insert.

10. The fishing lure mold as defined in claim 9 wherein said insert is removable from said cavity.

* * * * *